United States Patent [19]
Hurwitz et al.

[11] 3,922,907
[45] Dec. 2, 1975

[54] IN-BORE TURBINE INSPECTION DEVICE

[75] Inventors: Michael J. Hurwitz, Wilkinsburg; James W. Wonn, Irwin, both of Pa.

[73] Assignee: Westinghouse Electric Corporation, Pittsburgh, Pa.

[22] Filed: June 12, 1974

[21] Appl. No.: 478,808

[52] U.S. Cl. .................................................. 73/67.7
[51] Int. Cl.² ........................................ G01N 29/04
[58] Field of Search............ 73/67.7, 67.8 R, 67.8 S, 73/67.9, 71.5 US

[56] References Cited
UNITED STATES PATENTS

| | | | |
|---|---|---|---|
| 3,325,781 | 6/1967 | Harris | 73/67.7 X |
| 3,379,902 | 4/1968 | Harris et al. | 73/67.8 X |
| 3,548,644 | 12/1970 | O'Connor et al. | 73/71.5 US |
| 3,663,842 | 5/1972 | Miller | 73/67.8 X |
| 3,699,805 | 10/1972 | Bayre | 73/67.6 |

*Primary Examiner*—Richard C. Queisser
*Assistant Examiner*—John P. Beauchamp
*Attorney, Agent, or Firm*—George M. Medwick

[57] ABSTRACT

An inspection device for detecting cracks or fissures within a rotor member. The device has a transducer element and a lens for focusing acoustic waves produced by the transducer in a predetermined narrow area within a longitudinal plane of the rotor.

14 Claims, 10 Drawing Figures

IN-BORE TURBINE INSPECTION DEVICE

BACKGROUND OF THE INVENTION

1. Field of the Invention

This invention relates to inspection devices, and in particular, to an inspection device for detecting cracks within a rotor shaft of a turbine apparatus.

2. Description of the Prior Art

A turbine apparatus has a rotor or shaft member rotatably supported at the ends thereof within a casing. The rotor is usually fabricated of steel and has shrunk fit thereon a plurality of disc members. A plurality of rotating blades are mounted on each rotor disc to form an annular array of blades which interact with a motive fluid, commonly steam, to produce rotating mechanical energy.

To limit rotor weight and to eliminate material impurity, the rotor has a bore extending centrally and axially therethrough. It is possible that during fabrication of the rotor itself, or during operation of the turbine apparatus, cracks may occur within the steel material of the rotor. Such cracks may, for example, form along the surface of the bore when the mandrel, upon which the rotor is supported during fabrication, is removed, or, along the outer surface of the rotor shaft adjacent or beneath the disc. The presence of such cracks, if undetected, could lead to serious failure of the turbine apparatus.

For this reason, it is imperative that any cracks within the rotor be determined either before start-up of the turbine apparatus, or during normal maintenance periods. In the prior art, visual inspection of the exterior of the rotor surface may lead to the detection of such surface fissures if such inspection is performed before the rotor is mounted. However, visual inspection is impossible once the rotor is part of a completed turbine. Of course, visual inspection can never detect cracks which occur on the rotor surface beneath the discs or within the body of the rotor itself.

In order to detect cracks and fissures which occur in inaccessible areas, prior art methods involving an ultrasonic pulse-echo transducer technique have been employed. This technique disposes a transducer element on the outer surface of the rotor member and connects the transducer to a transmitter-receiver apparatus. The transmitter emits an electric signal within a predetermined frequency range, usually 1 to 15 MHz. This electric signal is impressed upon the transducer element, usually a piezoelectric material, and the transducer converts the electrical energy to mechanical energy in the form of acoustic waves. The acoustic waves radiate into the rotor member.

In a manner analogous to the operation of radar or sonar, when the propagating acoustic waves are interdicted by a crack or fissure within the rotor, a portion of the energy of the acoustic wave is reflected back to the transducer element. The transducer transforms the reflected acoustic energy into an electric signal which is conducted to the receiver portion of the signal means where it is displayed on an appropriate viewing device. The amplitude of the reflected signal when viewed on the viewing device gives some indication as to the size and the orientation of the crack or the fissure detected within the rotor member.

The magnitude of the reflected acoustic wave is dependent upon both the size and the orientation of the crack within the rotor. Thus, a larger amount of energy is reflected from larger fissures as opposed to the amount of energy reflected from smaller fissures. In addition, a greater portion of acoustic energy is reflected from fissures which lie perpendicular to the direction of propagation of the acoustic waves than from those fissures which lie parallel to the direction of propagation. It is apparent that the magnitude of the electrical voltage is also thus dependent upon the size or orientation of the fissure detected within the rotor.

The display apparatus can also pinpoint the distance from the rotor surface to where the crack or fissure is detected. Since a reflected acoustic wave from a fissure located deep within the rotor material takes longer to return to the rotor surface than does the reflected wave from a fissure located near the rotor surface, the displacement of the electric signal on the display means from an arbitrary origin can be utilized to pinpoint the distance from the rotor surface at which the fissure has occurred.

However, interrogation of the rotor by the use of the pulse-echo acoustic technique operating from the surface of the rotor has several disadvantages. One disadvantage is that it is difficult to detect small cracks within the rotor which lie close to the bore extending through the rotor. This is because the bore itself appears to the detection apparatus as a large reflected voltage, and small fissures within a close distance of the bore go undetected. Since a smaller amount of energy is reflected from the small crack or fissure, this smaller amount of energy is completely overshadowed by the large amount of energy reflected from the bore.

If the sensitivity of the apparatus is attempted to be improved to detect small cracks near the bore, a further problem is engendered. The only method by which sensitivity can be improved is to increase the frequency of the probing signal. However, to increase the frequency of the probing signal necessarily increases the transmission loss which dissipates the signal within the material. More energy is therefore required for higher frequency signals. It is usually difficult to increase the power of the transmitting signal in order to increase the sensitivity of near-surface pulse-echo techniques.

A second obvious problem with interrogation by a pulse-echo technique from the rotor surface is that the transducer element cannot be physically disposed over those portions of the rotor surface which are covered by the rotor discs. For this reason, cracks and fissures which occur within the axial portions of the rotor surrounded by the rotor disc usually go undetected.

To solve these problems attendant upon interrogation from the rotor surface, some prior art techniques introduced a transducer element into the bore of the rotor. Such "internal" scanning by a transducer disposed within the rotor bore eliminates the problem of accessibility to areas of the rotor surface covered by the rotor discs. However, internal scanning as utilized by the prior art results in a large lateral dispersion of energy and leaves a shallow region just beneath the surface of the bore unscanned. This shallow region, or dead zone, is caused by the inability of prior art devices to provide a sufficient concentration of energy into the dead zone. A further cause involves the lack of a sufficiently expansive beam overlap region in which both a transmit and a receive transducer are sensitive.

SUMMARY OF THE INVENTION

This invention provides an inspection device for detecting and locating cracks and fissures within a rotor by internal scanning along the surface of a bore extending centrally and axially through the rotor member. The inspection device disposes a transducer element acoustically coupled through suitable coupling means within the bore of the rotor member. Suitable focusing means are provided so as to limit the lateral dispersion of the propagated acoustic beam into a more narrowly constricted area in a longitudinal plane through the rotor than is attainable by the prior art. The disposition of the focusing means between the transducer element and the rotor member provides a narrower interrogation beam for scanning the material of the rotor member.

It is an object of this invention to provide an inspection device for detecting cracks or fissures occurring within a transverse and a longitudinal plane through a rotor member by interrogation of the rotor member from a bore extending centrally and axially therethrough. It is a further object of this invention to provide an inspection device having focusing means therein so as to permit interrogation of the rotor member within a narrowly constricted predetermined area located in a longitudinal plane through the rotor. It is a still further object of this invention to provide an inspection device having acoustically coupled focusing means disposed so as to narrowly focus an interrogation beam of acoustic waves within a predetermined longitudinal area within the rotor member.

BRIEF DESCRIPTION OF THE DRAWINGS

The invention will be more fully understood from the following detailed description of an illustrative embodiment taken in connection with the accompanying drawings, in which.

DESCRIPTION OF THE PREFERRED EMBODIMENTS

Throughout the following description, similar reference characters refer to similar elements in all figures of the drawings.

Figure 1:
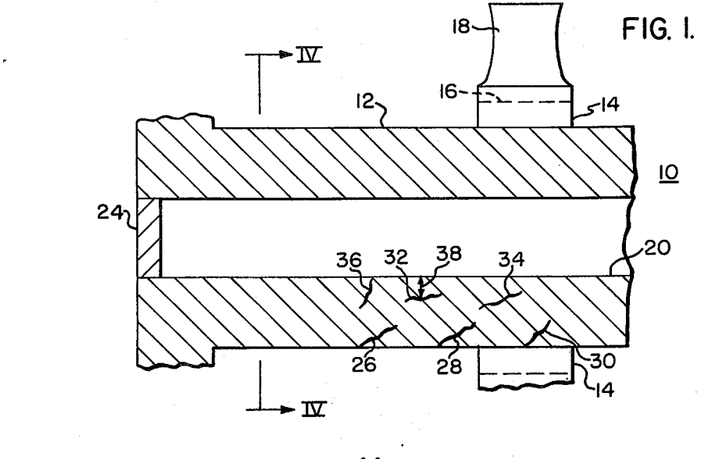
FIG. 1 is a section view taken in a longitudinal plane extending through a rotor.

Referring first to FIG. 1, a cross-section view of a turbine rotor 10 taken in a longitudinal plane extending through the rotor is shown. The outer surface 12 of the rotor 10 is substantially cylindrical in shape and has mounted thereon a rotor disc 14. The disc 14 is usually shrunk fit upon the rotor 10 and has a plurality of axially extending grooves 16 along the circumferential surface thereof. Each groove 16 receives the root portions of a corresponding plurality of rotating blades 18 to form an annular array of rotating blades 18 mounted on the rotor 10. As is well known, the annular arrays of rotating blades 18 mounted on the rotor 10 interact with a motive fluid directed thereon from stationary arrays of blades to convert energy carried by the motive fluid into rotational mechanical energy.

Figure 4:
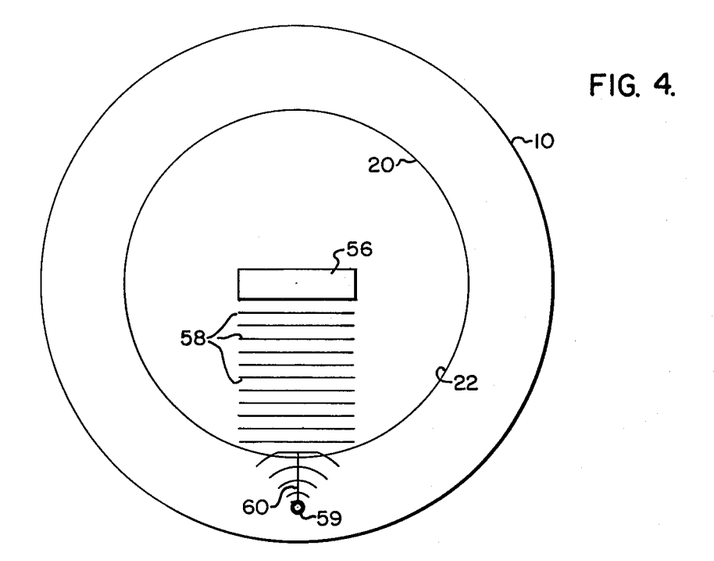
FIG. 4 is a view taken along lines IV—IV of FIG. 1 and illustrating a plane transverse to the longitudinal plane of FIG. 1.

The rotor itself is fabricated of high alloy steel and is rotatably supported at both ends thereof by suitable bearing members (not shown). In order to reduce the weight and to remove many defective impurities from the material used to fabricate the rotor 10, a bore 20 extends centrally and axially therethrough. The bore 20 is usually cylindrical in transverse cross-section and has a predetermined radius of curvature 22, as best seen in FIG. 4. The bore 20 is closed at both ends by a suitable bore plug 24.

During fabrication of the rotor 10, or during operation of the turbine apparatus, cracks or fissures may appear within the material of the rotor 10. Such cracks or fissures may, if left undetected, lead to the possibility of failure of the rotor 10. Cracks or fissures, such as those indicated by reference numerals 26, 28 and 30, may occur near the outer cylindrical surface 12 of the rotor 10. However, cracks may also occur within the body of the rotor 10 itself or near the surface of the bore 20, such as those indicated by reference numerals 32, 34 and 36.

Cracks located on the surface 12 of the rotor 10, such as those indicated by reference numerals 26 and 28, are able to be visually detected before the rotor 10 is disposed within the turbine element. However, once the turbine is fabricated, it is virtually impossible to discover even surface cracks, such as 26 and 28, by visual inspection. The disposition of the discs 14, the provision of the annular blade arrays on the rotor 10, and provision of the outer casing of the turbine, prevent visual inspection. It is also apparent that other cracks, such as that indicated by reference numeral 30, are hidden from view due to the disc 14. In addition, cracks similar to those indicated by reference numerals 32, 34, and 36, which lie beneath the surface 12 of the rotor 10, are not discoverable by visual inspection.

In order to determine the existence and location of internal cracks, prior art interrogation techniques utilize a pulse-echo transducer scheme whereby a source of acoustic waves is physically disposed on the outer surface 12 of the rotor 10 and acoustic waves are transmitted therefrom into the material of the rotor 10. In an analogous manner to radar on sonar detection, fissures within the body of the rotor reflect a portion of the propagated acoustic energy to a receiver channel within the transducer. The magnitude of the reflected energy, when translated into a visual electronic portrayal on a suitable view screen, indicates some measure of the size or orientation of the fissure reflecting the energy. The depth of the fissure within the body is pinpointed on the view screen by the magnitude of the displacement of the return impulse from an arbitrary origin. Since energy reflected from imperfections farther beneath the surface 12 of the rotor 10 takes a longer period of time to return to the receiver channel of the transducer than does reflected energy from imperfections nearer to the surface 12 of the rotor 10, the depth at which flaws occur can be relatively accurately pinpointed.

However, pulse-echo interrogation from the surface 12 of the rotor 10, hereinafter referred to as "external" interrogation for reasons which will become apparent herein, has a disadvantage in that it is frequently impossible to detect fissures within the rotor 10 which occur close to the bore 20. Since the bore 20 itself reflects a large amount of radiated acoustic energy, flaws which lie within a certain predetermined resolution distance 38 of the bore 20 reflect an amount of energy which is completely inundated by the amount of energy reflected from the bore 20. Thus, it is said in the art that the range resolution of the apparatus is limited.

It is possible to decrease the resolution distance and thereby detect cracks or fissures which occur at a point within the rotor 10 within a decreased radial resolution distance 38 from the bore 20. That is, by decreasing the resolution distance 38, only returns from those fissures or cracks within that resolution distance 38 will be "melted into" the return impulse from the bore 20.

However, to decrease the resolution distance 38, more generally defined as a distance within which two separate cracks will give one reflected energy return, it is necessary to decrease the wavelength of the acoustic wave. It is well known that the wavelength of the acoustic wave is inversely proportional to the frequency of the wave; therefore, to decrease the wavelength, one must increase the frequency. Thus, to increase the range resolution of the detection device one must decrease the resolution distance 38 to as close a radial distance as possible from the bore 20. In order to decrease the resolution distance 38, however, the frequency of the acoustic wave must be increased.

The steel used to fabricate the rotor 10 has associated therewith a predetermined transmission loss. The transmission loss is empirically found to be an exponential function which increases with increasing frequency. Thus, to decrease the wavelength one must increase the frequency of the acoustic signal, but to increase the frequency of the acoustic signals is to increase the transmission loss of the signal through the rotor material. Therefore, to continue interrogation throughout the rotor from the surface of the bore 20, it is necessary to increase the power output of the acoustic wave source. Frequently, this cannot be done. External interrogation, therefore, usually does not provide sufficient range resolution to determine the existence of cracks and fissures located within the rotor 10 near the bore 20.

Another drawback, with prior art external scanning, aside from limited range resolution, is that cracks such as crack 30 which are within the body of the rotor 10 cannot be detected because a transducer cannot be physically placed on the surface 12 of the rotor 10 due to the presence of the disc 14. Also, it is difficult to interrogate from a point on the surface 12 adjacent the disc 14, due to the steep angle a beam must travel from the surface 12 of the rotor 10 to discover a crack such as illustrated at numeral 30. It is thus both difficult and impractical to survey that portion of the volume of the rotor 10 under the disc 14. Usually required is a shear beam from a transducer placed adjacent one disc 14 on the surface 12 of the rotor 10. However, the beam cannot be introduced on an angle in excess of 70° from the vertical, as viewed in FIG. 1. Thus, fissures such as indicated by numeral 30 go undetected.

The prior art attempts to solve the difficulties involved with external interrogation by inserting a pulse-echo transducer within the bore 20 of the rotor 10 during normal shutdown periods required for normal turbine maintenance. Entrance is gained into the bore 20 through the opening created by removal of the plug 24 and the transducer element is inserted within the bore 20. Such "internal" inspection utilized by the prior art permits the transducer to emit acoustic waves from within the bore 20 into the rotor material.

Figure 2:
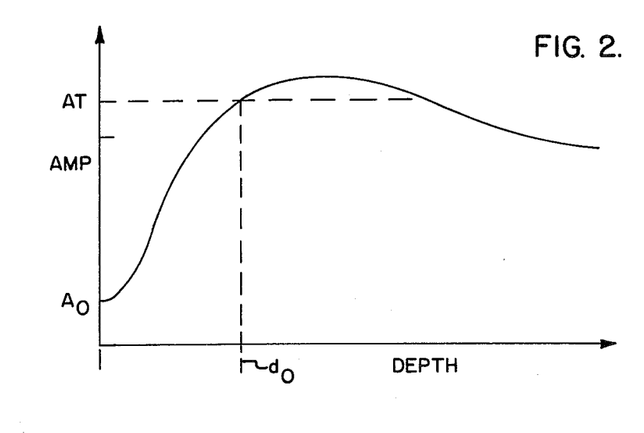
FIG. 2 is a graphical depiction showing the function relationship between amplitude of reflected energy from fissues within the body of rotor and the distance radially into the rotor of a prior art in-hose scanning device.

However, prior art interrogation from within the bore is not totally effective. Referring to FIG. 2, a graphical depiction of the functional relationship of the magnitude of the reflected energy from a predetermined sized fissure within the body of the rotor 10 and the depth, or distance, into the body of the rotor 10, as measured radially outward from the bore 20, is shown. Such a characteristic curve as seen in FIG. 2 is indicative of the operating characteristic of a prior art internal scanning device.

As is seen from FIG. 2, the amplitude of the reflected energy falls below a predetermined threshold value $A_T$ when the fissure occurs within a predetermined distance, $d_o$, into the body of the rotor 10. The distance $d_o$, or "dead zone", is the distance into the rotor 10 wherein the reflected energy is of a magnitude less than $A_T$ and is therefore not sufficient to trigger the inspection device.

The dead zone is a product of several factors. The first of these factors is that there is usually insufficient beam overlap between the transmitting and receiving beams. That is, the signal produced by the transmitting transducer and the signal able to be received by the receiving transducer do not overlap sufficiently to produce a sensitive-enough interrogation beam. The second factor is electronic "ringing" or "dead time," during which reflected energy returns from fissures close by the bore surface are not detected. A third factor for low sensitivity in the dead zone is the level of energy being transmitted into this area which permits reflection of only a small amount of energy from cracks and fissures. If there is only a small amount of energy entering an area, only a smaller amount of energy will be returned. If the amount of reflected energy is not sufficient to produce a signal amplitude equal to or greater than $A_T$, the threshold level, the fissure will go undetected.

In the prior art, it is a relatively simple matter to eliminate transducer "ringing". Simply separating the functions of the transducers, and providing one transducer for transmit and one to receive, and damping these transducers, will solve the "ringing" problem. More difficult are the problems of increasing the level of acoustic energy delivered into the dead zone between the rotor bore, and the problem of increasing the overlap of the transmitting and receiving beams.

Figure 3A:
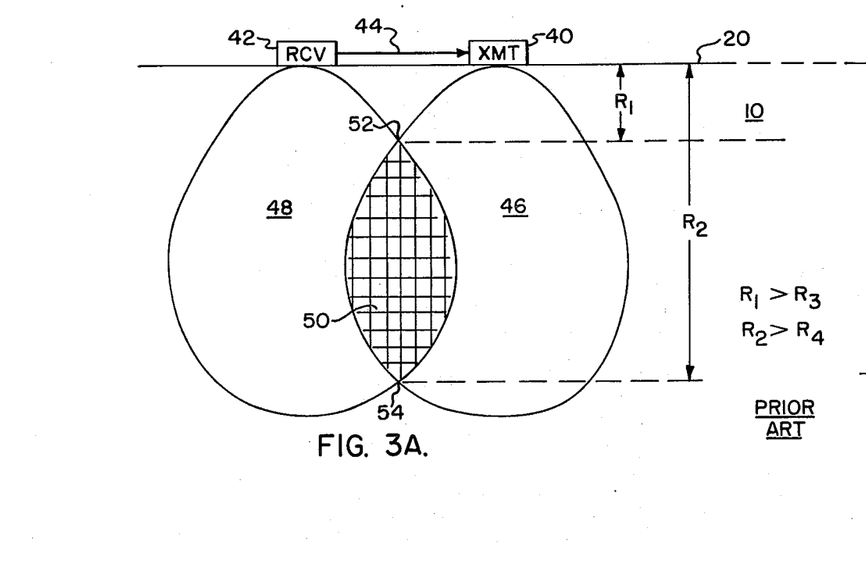
FIGS. 3A and 3B are diagrammatic views of a portion of a prior art internal scan interrogation pattern.
Figure 3B:
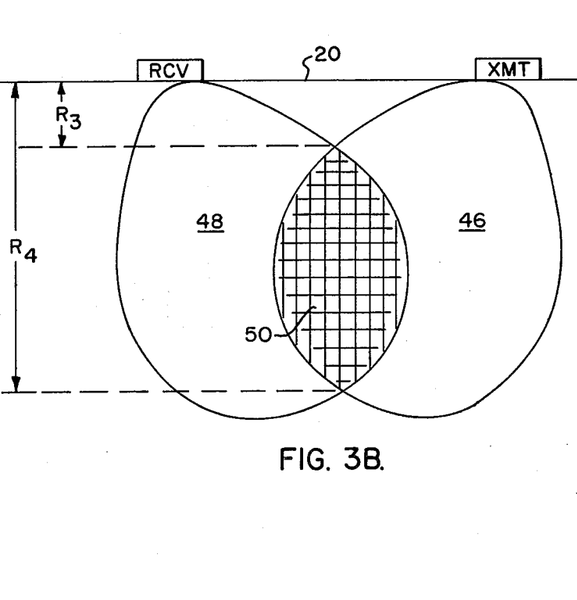

Referring now to FIG. 3, a diagrammatic view of the prior art interrogation pattern is shown. In FIG. 3A, both the transmitting transducer 40 and the receiving transducer 42 are separated a distance 44 (to eliminate "ringing") and each has an acoustic beam pattern 46 and 48, respectively. However, generally speaking, it is only in the intersection 50 of the respective zones of sensitivity 46 and 48 that fissures may be detected. This is so since, for a fissure to be insonified, or illuminated, by the beam 46 from the transmitting transducer 40 and, for any reflection produced by the impingement of acoustic energy on the fissure to be detected, by the receiving transducer 42, the fissure must be within the zone of acoustic beam overlap 50 of both the transmitting and receiving transducers. Thus, in only the shaded region 50 of the interrogation pattern is fissure detection possible.

As seen from FIG. 3A, the overlap region 50 begins at a point 52 a predetermined distance R1 beneath the surface of the bore 20. It extends to a distance 54 which lies a predetermined distance R2 beneath the surface of the bore. The distance R1 is the distance beneath the bore 20 wherein lies the "dead zone" and which corresponds to the distance $d_o$ on FIG. 2 where the energy reflected from fissures disposed therein is not of sufficient magnitude $A_T$ to trigger the receiving transducer. Of course, there is some amount of energy being introduced even into the dead zone, and it is to be understood that the crisply defined zones of sensitivity 46 and 48 for the transducers 40 and 42 respectively are illustrative only. Thus, some acoustic energy is introduced and some is received even within the dead zone (i.e., for distance beneath the bore 20 less than distance R1). However the magnitude of the energy reflected from within the dead zone is not sufficient to trigger the receiving device. Only reflections from fissures within the overlap area 50, radially beyond the dead zone, and between radii R1 and R2, are of sufficient magnitude $A_T$ to reach the threshold value for the receiving device.

The prior art attempted to increase the overlap area so as to decrease the dead zone, (making R3 in FIG. 3B less than R1 in FIG. 3A), but encountered difficulty in maintaining interrogation at deeper points within the rotor 10, as shown by distance R4 being less than R2.

This invention has as one of its objects increasing the amount of energy introduced into the dead zone so as to increase the energy reflected from that zone. If a greater amount of energy is introduced into the zone, a greater amount of energy or reflected return can be expected. Secondly, the invention provides reshaped acoustic beams so as to increase overlap area to decrease the dead zone space and yet not decrease sensitivity at the deeper interrogation depths.

Referring now to FIG. 4, a sectional view taken along section lines IV—IV of FIG. 1 and illustrating a plane transverse to a longitudinal plane of FIG. 1 shows diagrammatically the physical effect upon plane waves produced within the transverse plane. A source of plane waves 56 disposed within the bore 20 of the rotor 10 produces a series of parallel plane waves, indicated by reference numeral 58 in FIG. 4. The plane waves 58 produced by the source 56 travel through the medium within the bore at a given predetermined speed, that speed being the velocity of sound in the medium within the bore 20, and impinge upon the surface of the bore 20 having the predetermined radius of curvature 22. The wave 58 enter the material of the rotor 10. The plane waves 58 move through the material of the rotor 10 at a velocity faster than the velocity of the waves 58 in medium within the bore 20. Thus, due to the difference in transmission velocities of the media, and due to the curvature 22 of the bore 20, plane waves 58 produced in the transverse plane by the source 56 tend to a natural focus 59 located a radial distance 60 from the surface of the bore 20. The distance 60 is set by the physical parameters of the system. The location and determination of the natural focus point 59 beneath the surface of the bore 20 can be accurately predicted by an application of simple lens theory. If the ratio of sound velocities in the media is altered, or if the curvature 22 of the bore 20 is varied, the location of the natural focus will shift. The relationship, known as Snell's Law, which governs this phenomena is given by:

$$\frac{M}{f} = \frac{M' - M}{r}$$

where
  $M$ is the index of refraction for the rotor steel,
  $M'$ is the index of refraction for the medium within the bore
  $f$ is the focal point, the location of the natural focus, and
  $r$ is the radius of curvature 22 of the bore 20.

This relation is given in Jenkins and White, *Fundamentals of Optics*, McGraw Hill and Company, 3rd edition, 1957.

Figure 5:
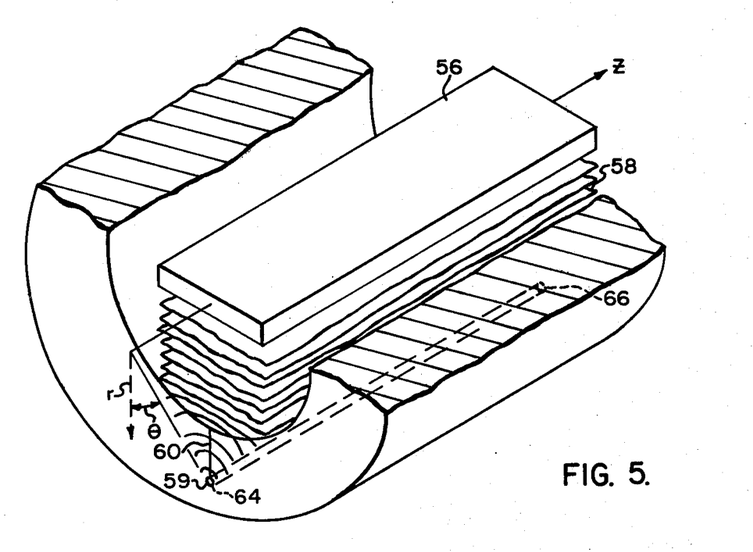
FIG. 5 is a diagrammatic view showing, in three dimensions, the location of a beam naturally focused by the rotor bore curvature.

Referring now to FIG. 5, a diagrammatic view of the location in three dimensions of a naturally focused acoustic beam using internal scanning of the prior art is shown. A cylindrical coordinate system using the well-known cylindrical coordinates $r$, $\theta$, and $z$ is shown. The source 56 of the acoustic plane waves 58 is disposed along the z-axis in $r$–$z$ (longitudinal) plane. The plane waves 58 produced from the source 56 extend parallel to the source 56 and are graphically displaced at increasing values of $r$ as the plane waves 58 propagate towards the bore 20 of the rotor 10. Due to application of the before cited relationship, the natural focus 59 occurs at the predetermined distance 60 beneath the surface of the bore 20 in $r$–$\theta$ (transverse) plane. At the same time, in the $r$–$z$ plane, the acoustic energy produced from the source 56 has no focus. Thus, in the $r$–$z$ plane, a "rod" of energy extends from points along the z-axis from points 64 to 66 in the $r$–$z$ plane. Such a wide dispersion in the $r$–$z$ plane precludes adequate detection of fissures or cracks which occur in the rotor 10. It is for this reason that internal scanning of the prior art utilizing an unfocused array of parallel plane waves in inadequate to discover the existence of cracks and fissures within the rotor 10. The dispersion of waves produced thereby does not permit a fissure to reflect a sufficient amplitude to surpass the threshold value.

Put another way, if the emitted energy from the source 56 is set arbitrarily at 10 watts, unfocused scanning from within the bore 20 of the rotor 10 will produce a beam extending in the direction of z-axis from points 64 to 66 and, (assuming that distance to be 5 cm.) the energy per unit length in the longitudinal plane will thus be 2 watts/cm. If, the energy per length ratio in the longitudinal plane can be increased to a value of 10 watts/cm., the increased magnitude of energy introduced permits an increased amplitude of reflected energy which causes improved detection capability of devices over devices utilized in the prior art can be effected.

This invention utilizes the effects of a natural focus caused by a curved, usually cylindrical, bore in the transverse (or $r$–$\theta$) plane and provides suitable means for focusing plane waves in the longitudinal (or $r$–$z$) plane. Thus, instead of the power per length ratio of 2 watts/cm. for example, utilization of focused plane waves in the longitudinal plane concentrates the acoustic energy in a, relatively speaking, smaller area than that which occurs in the prior art. It is thus seen that if focusing in the longitudinal plane is effected, the entire rotor may be scanned from within the bore 20 of the rotor 12 with a relatively concentrated beam. This increase in energy concentration increases the amount of energy introduced into the areas close to the bore, and increases the sensitivity in this region, without decreasing sensitivity in areas deeper beneath the bore. This is accomplished by focusing energy, which heretofore is inefficiently directed, into the dead zone.

Figure 6:
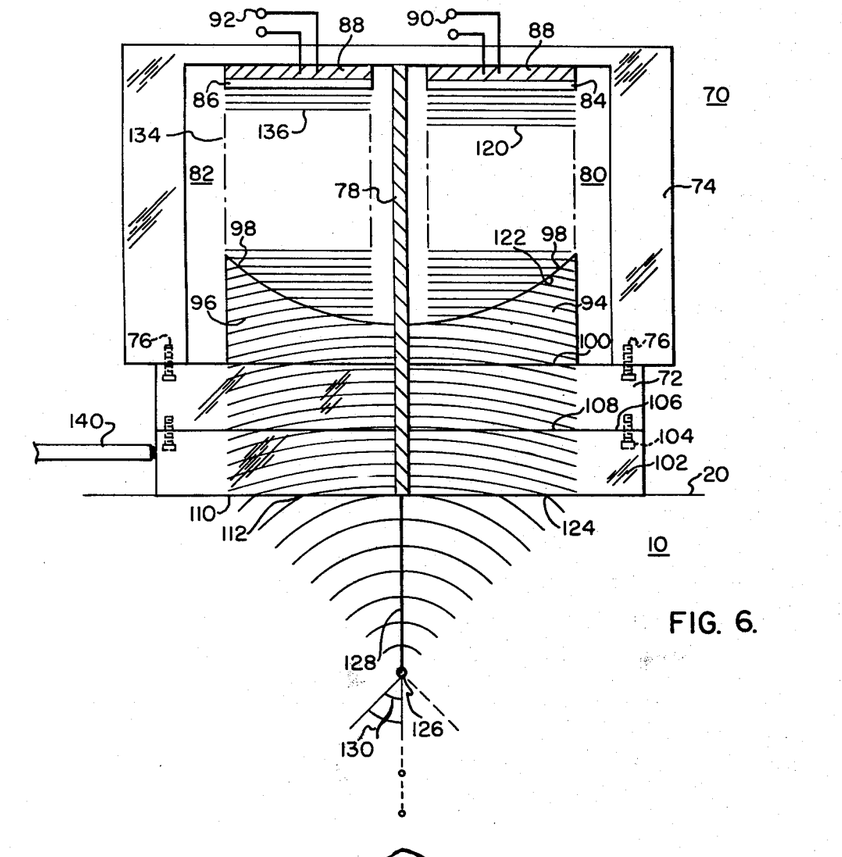
FIG. 6 is an elevational view, partially in section, showing an inspection device taught by this invention.

Referring now to FIG. 6, a view similar to the longitudinal section shown in FIG. 1 illustrating an inspection device 70 having means for focusing acoustic energy in the longitudinal plane is shown. In FIG. 6, the inspection device 70 detects cracks which are disposed within the body of a rotor 10 by internal scanning from within the bore 20 of the rotor 10. The device 70 focuses energy within a shallow area beneath the surface of the bore 20 of the rotor 10 to eliminate any dead zone (FIGS. 2 and 3) which exists in the prior art.

The device comprises a baseplate member 72 fabricated of polystyrene plastic, or other similar material, and having an external casing 74 securely affixed thereto by suitable attachment means, such as bolt 76.

A partition 78 physically separates and acoustically isolates the interior of the device 70 into a first, or transmitting, compartment 80 and a second, or receiving, compartment 82. A transmitting transducer element 84 is disposed within the transmitting compartment 80 of the device 70 and is mounted securely therein. A receiving transducer element 86 is disposed securely within the receiving compartment 82 of the casing 74. Both transducer elements have a suitable pad of backing material 88 disposed between them and the casing 74. The backing pad 88 is disposed so as to aid the acoustical isolation and reduce ringing of the individual transducers.

The transmitting transducer 84 is connected to a source of electrical energy (not shown) through a pair of leads 90 while the receiving transducer 86 is connected to a suitable electrical display apparatus (not shown) through leads 92. Focusing means, such as a transmitting lens 94, is mounted on the baseplate 72 within the transmitting compartment 90. A receiving lens 96 is similarly mounted on the baseplate 72 within the receiving compartment 82 of the casing 74. Both the transmitting lens 94 and the receiving lens 96 have a predetermined radius of curvature 98. It is to be understood that the radii of curvature of the lens members 94 and 96 could be different. Both lens members 94 and 96 are fabricated of material similar to the material utilized to fabricate the baseplate 72. This is so that no refraction of plane waves occurs between the lens members 94 and 96 and the baseplate 72. Also, if similar materials are used, and the sound velocities and densities of the lens members 94 and 96, and of the baseplate 72 are matched, the acoustic impedance of the system is matched. The maximum transfer of acoustic energy is affectuated by the matching of the sound velocities and densities. The junction 100 which lies between both lens members 94 and 96 and the baseplate 72 is planar junction. The lens members 94 and 96 utilize such a planar junction in order to facilitate manufacturing and fabrication of the device 70. Since the speed of acoustic waves within the material of the lenses 94 and 96 and the baseplate 72 is the same, and since there is a planar junction 100 therebetween, acoustic waves passing through the junction 100 between the lens members 94 and 96 and the baseplate 72 are not refracted.

A halogenated fluid completely fills both the transmitting compartment 80 and the receiving compartment 82 of the device 70. For this purpose, a silicone fluid is also acceptable. The fluid disposed within the device 70 exhibits a characteristic such that the velocity of acoustic waves transmitted therethrough is low compared to the velocity of waves in the material used to fabricate the lens 94 and 96 and the baseplate 72. The fluid is chemically inert and electrically non-conductive. Also, the ratio of acoustic velocities between velocity in the material adjacent the fluid and velocity in the fluid is, in this case, approximately 4:1. Practically speaking, as the ratio of velocities approaches 1, a device is much more difficult to manufacture, since the difference in velocities must be compensated for by a sharper radius of curvature of the lens which causes several problems, such as increased aberration in the lens. A fluid, suitable for disposition wherein the transmitting and receiving compartments 80 and 82 respectively, is a fluorinated hydrocarbon, such as that sold by 3M Corporation, under the trade name, FC-75. Alternatively, a chlorinated hydrocarbon may also be used.

A shoe member 102 is disposed adjacent the baseplate 72 and mounted thereon by suitable attachment means such as bolts 104. The shoe 102 is fabricated of material similar to the material used to fabricate the baseplate 72, both to maintain refraction at a minimum and also to match acoustic impedances from the baseplate 72 to the shoe 102. The junction 106 between the baseplate 72 and the shoe 102 is a planar junction, disposed so as to facilitate machining of the shoe 102. An acoustic coupling material, 108, such as oil, is disposed between the baseplate 72 and the shoe 102.

The external surface 110 of the shoe 102 has a curved surface thereon which corresponds to the radius of curvature 22 of the bore 20. The radius of curvature of the surface 110 of the shoe 102 must be slightly smaller than the radius of curvature 22 of the bore 20. Further, another layer 112 of the acoustic coupling material is disposed between the external surface 110 of the shoe 102 and the bore 20. The acoustic coupling can be any liquid, chemically inert, which wets the surface of the bore 20 between it and the external surface 110 of the shoe 102.

The electrical signal source (not shown) emits an electrical signal at a predetermined frequency, usually between 1 and 15 MHz, which is conducted to and impressed upon the transmitting transducer 84 by leads 90. The transmitting transducer 84, usually a piezoelectric material vibrating in the thickness mode, converts the electrical energy impressed thereon into mechanical energy in the form of parallel plane acoustic waves, as illustrated in FIG. 6 by reference numeral 120. The waves 120 are emitted from the transmitting transducer 84 and extend parallel to the surface of the bore 20, as viewed in the longitudinal section of FIG. 6.

The waves 120 produced by the transmitting transducer 84 are conducted through the FC-75 within the transmitting compartment 80 and exhibit a relatively low velocity while traveling therethrough. The waves 120 impinge upon the transmitting cylindrical lens 94 having the predetermined radius of curvature 98. Since the velocity of the waves within the lens 94 is greater than the wave velocity within the liquid FC-75, the waves are refracted, as shown at 122, in accordance with Snell's Law. The refracted waves pass from the transmitting lens 94 through the planar junction 100 into the baseplate 72 without refraction. The waves 120 also pass through the planar junction 106 between the baseplate 72 and the shoe 102 being refracted.

Waves which enter the rotor 10 from the shoe 102 through the acoustic coupling 112 are again refracted, as indicated at 124 since they impinge upon the surface of the bore 20 at a non-normal angle of incidence. Again applying Snell's Law, the waves entering the material of the rotor 10 converge at a focus 126 located a predetermined radial distance 128 beneath the surface of the bore 20 in the longitudinal plane. The distance 128 is less than the radial distance 60 beneath the bore 20 at which the natural focus 59 occurs.

It is seen that by focusing acoustic waves through the lens 94 having a predetermined radius of curvature 98 a focus 126 can be generated within the longitudinal plane.

As stated earlier, if the lens 94 is not placed intermediate between the source of the plane waves (that is the transmitting transducer 84), the parallel plane waves 120 emitted from the transducer 89 would not be focused in the $r$–$z$ plane since they enter the rotor material parallel to the surface of the bore 20 in this plane. Thus, as shown in FIG. 5, a wide energy intensity dispersion occurs in the $z$-direction in the $r$–$z$ plane if no lens 94 were utilized. The dispersion of energy caused by the plane waves, when coupled with the natural focus in the transverse ($r$–$\theta$) plane would generate the axial "rod" of energy located within the rotor 10 at a predetermined distance beneath the rotor bore 20 (FIG. 5). Such wide dispersion in the $z$-direction is unacceptable for detection purposes. With a focus generated through the use of the lens 94 as disclosed by this invention, the acoustic energy in the $z$-direction is focused within a narrow region in the $r$–$z$ plane. Thus, an increased amount of acoustic energy is introduced into the shallow portions of the rotor 10 just beneath the bore 20. Since the ratio of energy per unit length in the $z$-direction is increased, the extent of the dead zone is decreased.

Figure 7A:
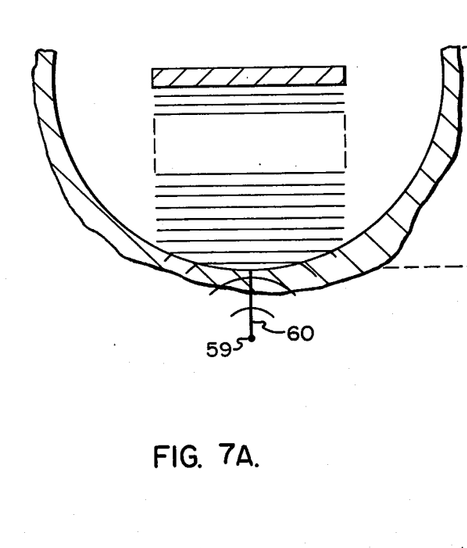
FIGS. 7A and 7B are views similar to FIG. 5, showing the location of the focused acoustic beam in the longitudinal direction and its relation to a beam focused in the transverse plane; and, FIG. 8 is a diagrammatic view showing the overlap region of the transducers, produced by an inspection device embodying the teachings of this invention.
Figure 7B:
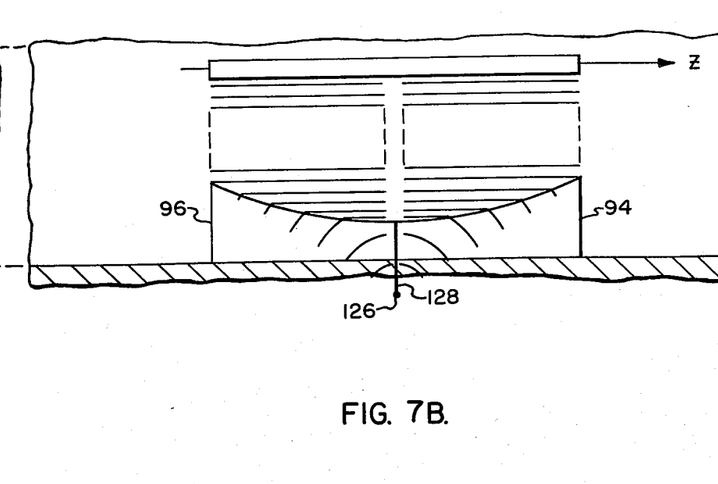

Referring now to FIG. 7, a view similar to FIG. 5 shows the location of a naturally focused acoustic beam in the transverse ($r$–$\theta$) plane and a focused acoustic beam along the $z$-direction in the $r$–$z$ plane. In FIG. 7A, the natural focus 59 is still obtained within the transverse ($r$–$\theta$) plane. Further, in FIG. 7B, the second focus 126 in the longitudinal ($r$–$z$) plane, due to the disposition of the transmitting lens 96, is shown. It is understood that, in FIG. 7A, the lens 94, which shown in FIG. 7B, is omitted for clarity. It is seen that the disposition of the transmitting lens 94 in the longitudinal ($r$–$z$) plane does not affect the location of the natural focus 59 in the transverse ($r$–$\theta$) plane. Thus, the natural focus 59 still occurs at a radial distance 60 beneath the surface of the bore 20 in the transverse plane where the focus 126 occurs at a radial distance 128 beneath the surface of the bore 20. The distance 60 is greater than the distance 128. Instead of the axial "rod" of energy as illustrated in FIG. 5, there are two distinct focii 59 and 128. Thus, the ratio of intensity of energy per unit length in the longitudinal plane is increased at shallow depths (the dead zone) when there is disposed in that plane a transmitting lens 94 as taught by this invention.

Of course, utilization of a spherical or two-plane lens so as to alter the location of the natural focus in the transverse ($r$–$\theta$) plane (FIG. 7A) is possible. Construction of such a two-plane lens can be effectuated through utilization of computer ray tracing techniques and a lens so fabricated and disposed is within the contemplation of this invention. It is thus within the contemplation of this invention to provide lens means able to alter the disposition of the natural focus 59 in the transverse ($r$–$\theta$) plane, as well as to provide the focus 126 in the longitudinal ($r$–$z$) plane.

It is seen that by focusing acoustic energy in the $z$-direction through the use of the lens 94, an increased amount of energy is available in what is formerly a dead zone. As was stated earlier, only fissures, such as 130, which are within the sensitive region of the transmitting transducer 84 will be illuminated, or insonified, by acoustic beams such as those emanating from the transducer 84. The effect of the lens 94 in the device 70 is to illuminate, or insonify, an area of the rotor closer to the bore 20. However, as was also stated earlier, only those fissures which occur within the overlapped area where the sensitivity of the receiving and transmitting transducers occur will be detected. Therefore, the device must, in addition to increasing the area in which the sensitivity of the transmitting transducer occurs, increase the overlap region so that fissures can be detected. To get a signal from a fissure such as 130, then, the fissure must lie within the overlap regions of sensitivity, both of the transmitting transducer 84 and of the receiving transducer 86.

Disposition of the lens 94 has the effect of reshaping the transmit acoustic beam so as to envelop an area of the rotor 10 heretofore not insonified. Thus, the dead zone is reduced by the use of the lens 94. But, to get a detectable signal, the fissure must fall within the overlap region where sensitivity to both the transmitting transducer 84 and to the receiving transducer 86 occurs.

Figure 8:
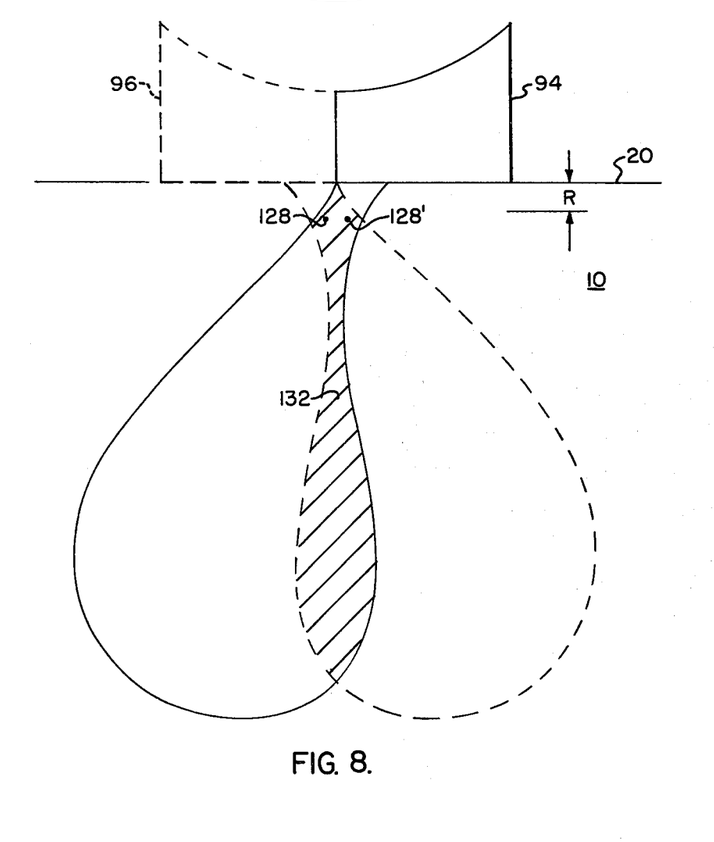

To produce this overlap, the receiving lens 96 is disposed within the device 70. Referring to FIG. 8, the focus 128 produced by the transmitting lens is shown. If the receiving transducer were imagined to exhibit transmit properties (which could occur simply by interchanging the connection from the transmit source from leads 90 to leads 92), waves so produced would be focused by lens 96 at a focus 128'. Thus, the shaded area 132 indicated on FIG. 8 bounded by the solid lines, indicating the transmitting sensitivity, and the dotted lines, indicating the receiver sensitivity, would be the area of overlap, and thus the area of detection sensitivity.

It is seen that the distance R at which the overlap begins, occurs at a point much closer beneath the rotor 10 surface than is the point $R_1$ in the prior art (see FIG. 3).

By choosing the appropriate lens configuration, the overlap area of reshaped acoustic beams could be disposed so as to substantially eliminate the dead zone. It should be noted, that despite the decrease, or elimination, of the dead zone, there is no diminution in overlap at deeper reaches of the rotor (FIG. 3).

The overlap region can be controlled by changing the dimension of the lenses. For example, if an integral lens were to be cut in a plane extending through its vertical centerline, and a symmetric region removed from each of the lens-halves produced by the cut, and, if the lens-halves were reunited, an overlap pattern such as shown in FIG. 8 would occur. The distance between the focii 128 and 128' would be equal to the length of lens removed. In a similar fashion, the degree of overlap of transmitting and receiving beams taught by this invention are controlled.

Referring again to FIG. 6, it is seen that fissure 130 is within the overlap area of sensitivity in which both the receiving transducer 86 and the transmitting transducer 84 are effective. Energy in this region is reflected by the fissure 130 and is returned to the receiving transducer through the rotor material 10. The lens 98 in the receiving compartment 82 operates analagously to the lens in the transmitting compartment 80. In fact, the transmit and receive function may be interchanged with no change in the operation of the device 10.

The waves reflected from the fissure 130 propagate through the rotor material 10. The waves pass through the acoustic coupling, through the material of the shoe 102, and baseplate 72, and into the receiving lens 96 through the planar junction 100 therebetween. The receiving lens 96 again deflects the refracted acoustic waves into parallel plane waves as illustrated at 134. The arrays of parallel plane waves illustrated by reference 134 are again conducted through the FC-75 liquid within the receiving compartment 82 of the device 70 and impinge upon the receiving transducer 86. The receiving transducer 86 translates the acoustic energy into electrical signals which are conducted through leads 92 to a suitable signal display device (not shown). The magnitude of the display voltage on the display device and the displacement of that display voltage from an arbitrary origin gives a measure of the size of the fissure 130.

Interrogation of the entire rotor 10 can be accomplished by successive axial displacements together with circumferential rotation, in the bore, the distance of axial displacement being equal to the distance in the longitudinal plane between the transmit and receive focus (FIG. 8). Alternatively, a helical spiral scan, the pitch of the spiral being equal to the distance between the transmit and receive focii (FIG. 8) can be utilized. For this purpose, suitable propelling means 140 are provided.

If desired, tilting means could be added so as to shift the detection pattern (the overlap region) to the left or to the right of the region occupied by the pattern as shown in FIG. 6. For example, if both the transmitting and the receiving transducer were tilted in a counterclockwise direction, the overlap region would shift in a direction counterclockwise from the region shown occupied in FIG. 8.

Tilting both transducers in a clockwise direction the overlap region would shift in a clockwise direction from the region shown in FIG. 8. By tilting both the transmitting transducer and the receiving transducer, in the direction of the centerline of the device the outer distance into the rotor of the scanning region can be increased.

In summary, it is seen that by disposing a lens so as to reshape the acoustic beam provided by the transmitting transducer, acoustic energy is concentrated in a region of the rotor closer to the surface of the bore than is possible in the prior art. In addition, by increasing the degree of overlap between the reshaped acoustic beams produced by the lens, the sensitive region of detectability of regions within the rotor is increased, and the "dead zone" of the prior art eliminated.

We claim as our invention:

1. A device for detecting cracks existing within the body of a test member, the member having an axis extending longitudinally therethrough, said device comprising:

a base member having a casing attached thereon, a partition dividing said casing into a transmit compartment and a receive compartment, transducer means for producing high frequency acoustic energy, said transducer means including a transmit element for transmitting high frequency acoustic energy and a receive element for receiving high frequency acoustic energy, said transmit element being disposed within said transmit compartment within said casing, said receive element being disposed within said receive compartment within said casing, and, focus means for focusing said high frequency acoustic energy produced by said transducer means at a focus within said test member and in a plane containing said longitudinal axis, said focus means including a transmit lens element and a receive lens element, said transmit lens being mounted on said base member within said transmit compartment opposite said transmit element of said transducer means, said receive lens being mounted on said base member within said receive compartment opposite said receive element of said transducer means, said transmit compartment and said receive compartment each having a material disposed therein, said material being disposed between said elements of said transducer means and said lens elements of said focus means disposed in said transmit compartment and said receive compartments, said material exhibiting a characteristic such that the speed at which said acoustic energy travels through said material is less than the speed at which said acoustic energy travels through said focus means and said base member.

2. The device of claim 1, wherein said material disposed within said transmit compartment and within said receive compartment is a fluorinated hydrocarbon material.

3. The device of claim 1, wherein said material disposed within said transmit compartment and within said receive compartment is a chlorinated hydrocarbon material.

4. The device of claim 1, wherein said material disposed within said transmit compartment and within said receive compartment is a silicone material.

5. The device of claim 1, wherein said test member has a bore with a predetermined radius of curvature, and wherein said base member has an external surface having a radius of curvature substantially equal to the radius of curvature of said bore, and further comprising, acoustic backing material disposed between said transmit element and said receive element of said transducer means and said casing.

6. The device of claim 1, wherein said base member is fabricated of a substance having substantially the same sound velocity and density as the substance used to fabricate said focus means, wherein said frequency range of said acoustic energy produced by said transducer means lies within the frequency band between 1 to 15 MHz.

7. The device of claim 1, wherein said test member focuses said acoustic energy produced by said transducer means at a focus point located at a distance within said member functionally related to the geometry of said member and in a plane transverse to said longitudinal axis, said transmit lens and said receive lens focussing said acoustic energy produced by said transducer means at a focus point located a predetermined distance in said member in said plane containing said longitudinal axis, said predetermined distance in said member in said plane containing said longitudinal axis being different from said distance in said member in said plane transverse to said longitudinal axis.

8. The device of claim 7, wherein, said device has a centerline extending through said partition, and, said focus point at which said acoustic energy is focussed within said longitudinal plane is axially displaced from said centerline of said device.

9. The device of claim 1, wherein, said transmit lens has a radius of curvature and a focus point disposed a predetermined distance within said test member associated therewith, said receive lens has a radius of curvature and a focus point disposed a predetermined distance within said test member associated therewith, said radius of curvature of said transmit lens being equal to said radius of curvature of said receive lens whereby said focus point for said transmit lens occurs at a distance within said member in said longitudinal plane equal to the distance within said member in said longitudinal plane at which said focus point for said receive lens occurs.

10. The device of claim 9 wherein said focus point of said transmit lens is axially coincident in said longitudinal plane with said focus point of said receive lens.

11. The device of claim 9 wherein said device has a centerline extending through said partition, and wherein said focus point of said transmit lens is displaced axially from said centerline and is disposed radially adjacent to said receive lens, and said focus point of said receive lens is displaced axially from said centerline and is disposed radially adjacent to said transmit lens, whereby acoustic energy focussed by said transmit lens to said transmit focus point overlaps acoustic energy focussed by said receive lens to said receive focus point.

12. The device of claim 1 wherein said transmit lens has a radius of curvature and a focus point disposed at a predetermined distance within said test member associated therewith, said receive lens has a radius of curvature and a focus point disposed a predetermined distance within said test member associated therewith, said radius of curvature of one of said lenses being different from the radius of curvature of the other of said lenses whereby said focus point for said first-mentioned lens occurs at a distance in said longitudinal plane within said member different from the distance in said longitudinal plane at which said focus point of said other lens occurs.

13. The device of claim 12, wherein said device has a centerline extending through said partition, and wherein said focus point of said first-mentioned lens is displaced axially from said centerline and is disposed radially adjacent to said other of said lens, and said focus point of said other lens is displaced axially from said centerline and is disposed radially adjacent to said first-mentioned lens, and, whereby acoustic energy focussed by said first-mentioned lens to said first-mentioned focus point overlaps acoustic energy focussed by said other lens to said other focus point.

14. The device of claim 1, wherein said transmit lens and said receive lens are interchangeably and removably mounted on said base member.

* * * * *